United States Patent
Cramer

[11] 3,898,047
[45] Aug. 5, 1975

[54] OXYGEN GENERATION SYSTEM

[75] Inventor: Robert L. Cramer, Davenport, Iowa

[73] Assignee: The Bendix Corporation, South Bend, Ind.

[22] Filed: July 17, 1973

[21] Appl. No.: 380,036

[52] U.S. Cl. .................. 23/281; 23/284; 55/24; 55/25; 55/26; 55/33; 55/58; 55/162; 128/142.2; 128/194 R; 137/81; 137/99; 423/579
[51] Int. Cl.² ............................................. B01J 7/00
[58] Field of Search ............ 23/281, 284; 55/58, 33, 55/162, 25, 24, 26; 137/81, 99; 128/142.2-142.5; 423/579

[56] References Cited
UNITED STATES PATENTS

| | | | |
|---|---|---|---|
| 1,048,812 | 12/1912 | Doherty | 423/579 |
| 2,944,627 | 7/1960 | Skarstronm | 55/33 |
| 3,160,486 | 12/1964 | Busch, Jr. | 55/33 X |
| 3,720,501 | 3/1973 | Cramer et al. | 23/281 |
| 3,768,466 | 10/1973 | Johnson | 128/142.2 |

Primary Examiner—James H. Tayman, Jr.
Attorney, Agent, or Firm—Leo H. McCormick, Jr.; William N. Antonis

[57] ABSTRACT

A system for enhancing the operation of an oxygen extractor by reacting an oxygen enriched effluent with heated beds of barium oxide to reduce the time involved in sequentially producing pure oxygen from these beds by lowering the pressure therein. A separator which fractionalizes air into the oxygen enriched effluent produces a nitrogen enriched effluent as a by-product. The nitrogen enriched effluent is carried in a conduit to cool the produced oxygen which is produced during transfer to a storage container. Cycling controls connected to the separator and the oxygen extractor synchronize the fractionalization of the air and the heating of the beds of barium oxide elements to establish the optimum operational time interval for each to continually produce the pure oxygen.

6 Claims, 1 Drawing Figure

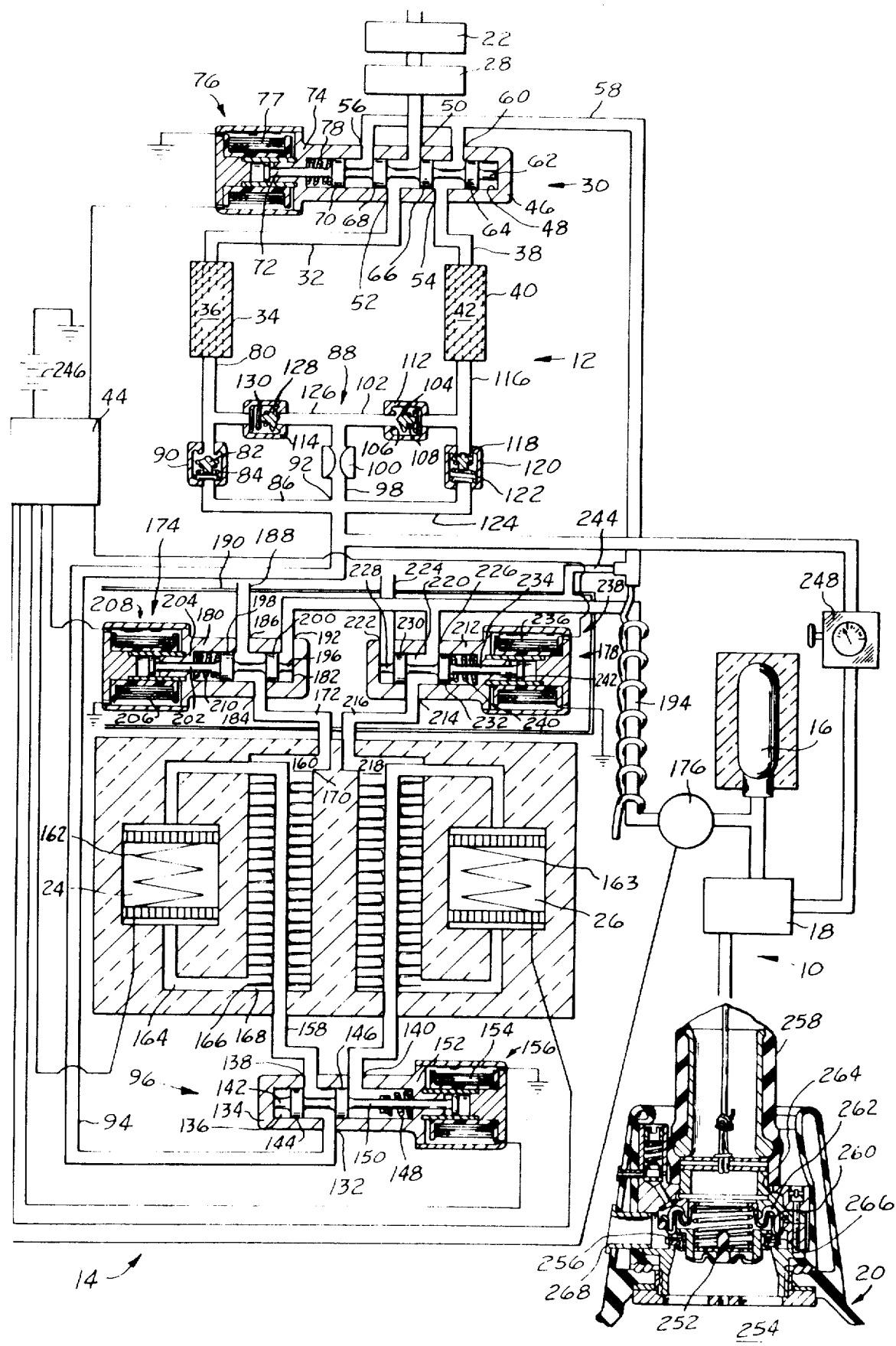

3,898,047

OXYGEN GENERATION SYSTEM

BACKGROUND OF THE INVENTION

The generation of oxygen from air through the reversible Barium Oxide-Dioxide (Brim process) has been amply described in U.S. Pat. No. 1,048,812. This patent describes the difficulty in completely converting $B_nO$ to $B_nO_2$ due to the slowness with which the air combines with the $B_nO$. As taught in this patent the time required to carry out the reaction in each dioxiding operation will vary between 5 and 15 minutes. In an attempt to produce a sufficient amount of oxygen capable of sustaining the physiological well being of an individual, the quantity of $B_nO$ and size of the insulation package required have prevented this type of apparatus from being completely portable. As a result, acceptability of the Brim process for producing oxygen has been limited to commercial endeavors such as steel mills, sewage purification and stationary hospital supply containers.

Through experimentation it has been found that air can be fractionalized by removing various components thereof through the affinity of these components with various molecular sieve materials. In such an apparatus, as shown in U.S. Pat. No. 2,944,627, U.S. Pat. No. 3,280,536 and U.S. Pat. No. 3,142,547, air is normally communicated to containers holding the molecular sieve material having an Angstrom pore size 5 to continually produce an oxygen enriched effluent by the so-called pressure swing technique. However, generation of oxygen through the use of a progressive molecular sieve material has an upper limitation of 96% oxygen since argon in particular and other inert gases are not attracted to the molecular sieve material. As a result the use of this oxygen enriched effluent has been limited to commercial applications.

SUMMARY OF THE INVENTION

Through experimentation I have found that the chemical reaction rate of $B_nO \rightarrow B_nO_2$ is reduced to about 15-20 seconds by increasing the $O_2$ in the feed air to about 50%. An apparatus having first and second containers of molecular sieve material can continually produce an oxygen enriched effluent through the pressure swing technique. Air from the environment free of contaminants is communicated through one of the molecular sieve containers where nitrogen is retained in an amount to produce an effluent containing approximately 50% oxygen. This effluent is divided into a first portion and a second portion through a series of flow control means. The first portion is carried to a cycling valve means for controlling the oxygen enriched air flow to Barium Oxide-Barium Dioxide reaction chamber. The air flow through each molecular sieve will be approximately 10-20 seconds to permit the second portion to flow back through the other of the molecular sieve containers to remove any nitrogen retained therein to produce a nitrogen enriched effluent. This nitrogen enriched effluent is utilized to cool the storage container where the 100% oxygen extracted from the $B_nO_2$ is retained and to cool the valves controlling the communication of nitrogen effluent from a first $B_nO$ chamber during a first mode of operation while a vacuum is removing oxygen from a second $B_nO_2$ chamber. This pure oxygen in the storage container is connected to a demand regulator means to allow a recipient to breath oxygen enriched air in an open loop breathing system.

It is therefore the object of this invention to provide a system for enhancing the operation of an oxygen extracting means wherein the reversible process of converting $B_nO$ to $B_nO_2$ by the reaction of air is enhanced with an oxygen effluent to reduce the conversion time.

It is still a further object of this invention to provide an oxygen extraction system with a primary oxygen effluent which is reacted with $B_nO$ to produce $B_nO_2$ and a secondary nitrogen effluent to cool the operational component controls.

It is another object of this invention to provide an oxygen extraction system with a molecular sieve component to supply an oxygen enriched fluid which acts as a catalyst during a first mode wherein the barium oxide is converted to barium dioxide.

It is still a further object of this invention to provide a barium oxide-barium dioxide oxygen generator system with a molecular sieve material for producing pure oxygen from air by raising the percentage of oxygen in the air and reducing the energy and time requirements in the reaction.

These and other objects will be apparent from reading this specification and viewing the drawings.

BRIEF DESCRIPTION OF THE DRAWINGS

The drawing shows an oxygen extraction system with sectional views of the cycling means for controlling air flow through a molecular sieve means and oxygen enriched air through a barium oxide-barium dioxide chamber to provide an optimum operational time interval in which to deliver pure oxygen to a storage reservoir.

DETAILED DESCRIPTION OF THE PREFERRED EMBODIMENT

In the drawing the oxygen extraction system 10 consists of a first section 12 where air from the environment is preconditioned by increasing the oxygen content therein and a second section 14 wherein this preconditioned air is presented to react with barium oxide and form barium dioxide in a first mode of operation and with a reduction in pressure releases pure oxygen for retention in a storage container 16. The storage container 16 is connected through a pressure reducer 18 to a breathing mask 20 of a recipient.

In more particular detail the first section 12 consists of a particle filter 22 wherein air under pressure from the environment is introduced into the system. The particle filter 22 will eliminate airborne material such as salt, sand and dust. The particle filter 22 includes a separator and droplet filter wherein the airborne particles are reduced down to as much as 3 microns in size. This type of particle filter is known and as such the exact details are not considered part of this invention. In addition, it will also remove almost all of the water and aerosols which have been entrained in the air in the environment. Through this preconditioning, essentially all the salts and entrenched oil and gases are removed.

It is essential that these contaminants be removed in filter 22 to prevent unwanted reactions with the oxygen producing barium oxide crystals retained in either beds 24 and 26 in the second section 14, later in the system, since contaminants such as hydrogen sulfide, oil and water of hydration effect the efficiency of the regeneration of the barium oxide system. The above constituents at the operating temperature of about 750°C will react with either barium oxide or barium peroxide in the following undesired manner. Excessive water and carbon dioxide will form barium hydroxide or barium carbonate thus eliminating the effectiveness of the barium oxide in the generation system. On the other hand, oil entering into the heated bed would ignite, thereby forming carbon dioxide and water which also would bring an unwanted gas into the oxygen generation system. Therefore, it is necessary that the air from the environment be essentially stripped of contaminants prior to being introduced into the barium oxide beds, through the filter 22 in order that the barium oxide generation system will produce oxygen through the regeneration cycling process for many cycles without undue deterioration. This preconditioned air from the environment will pass through a pressure reducer 28 before entering the control valve means 30. The control valve means 30 will alternately regulate the flow of preconditioned air along a first path through conduit 32 to a first container 34 holding a quantity of molecular sieve material 36 and along a second path through conduit 38 to a second container 40 holding a quantity of molecular sieve material 42 for predetermined time periods as set in timing means 44. The timing means 44 is an electrical control clock which will supply the electrical components with energy for a set time interval.

The control valve means 30 includes a housing 46 which has a bore 48 therein. The bore 48 has a first port 50 connected to the pressure reducer 28, a second port 52 connected to the chamber of the first container 34 wherein the molecular sieve material is retained, a third port 54 connected to the chamber of the second container 40 wherein the molecular sieve material is retained, a fourth port 56 and a fifth port 60 connected to conduit 58 through which a nitrogen enriched effluent is communicated to cool conduit 194 carrying the oxygen released by the barium dioxide to the storage container 16. A piston 62 located in bore 48 has a series of lands 64, 66, 68 and 70 which separate the ports therein to determine whether the preconditioned air will travel in the first or second flow path. A stem 72 attached to the piston 62 passes through a bearing wall 74 into the field of a solenoid means 76. A spring or resilient means 78 located between bearing wall 74 and land 70 will urge the piston 62 against the housing 46 at the bottom of bore 48. In this first position, the filtered air will flow through the first port 50 and out the second port 52 to the first molecular sieve in container 34 along the first flow path.

The molecular sieve material will normally be a zeolite having a uniform pore size of about 4 angstroms in order to retain nitrogen while allowing oxygen to freely pass therethrough. Some other typical materials chosen for adsorption of water vapor, odor elimination and removal of other components in air which may be located in series with or in addition to the zeolite molecular sieve include Mobilbeads, silica gel adsorbents, activated carbon, Fuller's earth, bone char, etc. The filtered air with the resilient means 78 holding the piston 62 as shown in the drawing will normally flow for about 10–15 seconds from the first port 50 to the bore 48 out the second port 52 into the conduit 32. The molecular sieve material will retain nitrogen in the first container 34 to produce an oxygen enriched effluent product of about 50% oxygen which will flow into conduit 80 past poppet 82 by overcoming spring 84 of the first check valve 90 and into branch 86 of the parallel conduit means 88. At junction 92 this oxygen enriched effluent will be divided with a first portion flowing in conduit 94 to the cycling control means 96 of the second section 14 and a second portion flowing in passage way 98 past restriction 100 into branch 102. In branch 102 this second portion will move poppet 104 of check valve 112 away from seat 106 by overcoming spring 108 to flow into the chamber of molecular sieve material in the second container 40. As this second portion of oxygen enriched effluent back flows through container 40 any nitrogen retained therein in a prior cycle will be picked up and flushed out by conduit 38 which connects the container 40 with the third port 54. From the third port 54 the now nitrogen enriched second portion will flow in the bore 48 out the fifth port 60 to conduit 58 for cooling the oxygen in conduit 194 before reaching container 16. After 10–15 seconds, the timing means 44 will send an electrical signal to the solenoid means 76 to develop a magnetic field therein causing stem 72 to move in bearing wall 74 against the opposition of spring 78 to shift the piston 62 and change the direction of the filtered air flow from the first path to a second path. In the second path, filtered air will travel from the first port 50 through the bore 48 out the third port 54 to the second container 40 where the nitrogen contained therein is retained to produce the oxygen enriched effluent. The oxygen enriched effluent will flow in conduit 116 past the poppet 118 in the check valve 120 by overcoming the resilient means 122. This oxygen enriched effluent will flow in branch 124 of the parallel conduit means 88 until reaching junction 92. At junction 92, the first portion will continue to flow through conduit 94 to the cycling control means 96 while the second portion will flow through restriction 100 into branch 126 past poppet 128 at check valve 114 by overcoming resilient means 130 to reverse flow through the molecular sieve material in container 34. Similarly, when the oxygen enriched effluent backflows through the molecular sieve material in container 34, the nitrogen retained therein in the previous cycle is flushed into conduit 32 through the second port 52 and the fourth port 56 to conduit 58. The timing means will regularly energize the coil 77 of solenoid 76 for the optimum time interval for the molecular sieve material to continually produce an oxygen enriched effluent. The oxygen enriched effluent will have an average pressure of from 3–4 atmosphere pressure when presented to the inlet port 132 of the cycling means 96.

The cycling means 96 includes a housing 134 with a bore 136 therein. The bore 136 has a first outlet port 138 and a second outlet port 140 adjacent the inlet port 132. A plunger 142 has a first land 144 and a second land 146 for preventing simultaneous communication from the inlet port 132 with the first outlet port when spring 148 positions the plunger 142 against the bottom of bore 136. The plunger 142 has a stem 150 which extends through a bearing wall 152 into the center of the coil 154 of solenoid means 156. With the solenoid means 156 de-energized as shown in the drawing, the oxygen enriched effluent will flow in conduit 158 through the heat exchange chamber 160 into the bed 24 of barium oxide element. A resistive coil 162 connected and operated by the timing means 44 will raise the temperature of the barium oxide element to about 750°C during which time the oxygen enriched effluent will react with the barium oxide to form barium dioxide according to the following formula:

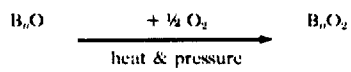

The product passing out the bed 24 into conduit 164 connected to the heat exchanger chamber 160 at this time has a high concentration of nitrogen with a temperature approaching 750°C. This heated nitrogen enriched product passes through the series of disc or fins 166, each of which has random perforations to provide a serpentine path between entering the heat exchange chamber 160 at point 168 and exiting at point 170. While in this serpentine path the heated nitrogen enriched product gives up heat to the incoming oxygen enriched product flowing in conduit 158. This nitrogen enriched product will pass through conduit 172 into a first diverter valve means 174.

The first diverter valve means 174 consists of a housing 180 having a bore 182 therein. The bore 182 has an inlet port 184 connected to conduit 172 for receiving the nitrogen enriched product from the heat exchanger chamber 160, a first outlet port 186 which is connected to the atmosphere by conduit 188 passing through shroud 190, and a second outlet port 192 which is connected to a vacuum pump 176 by conduit 194. A plunger 196 which has a first land 198 and a second land 200 is located in bore 182 to segregate the first outlet 186 from the second outlet 192. A stem 202 attached to the plunger 196 extends through a bearing wall 204 into the center of the coil 206 of the solenoid means 208. A spring or other resilient means 210 is located between the bearing wall 204 and land 198 to hold the plunger 196 against the bottom of the bore 182 as shown in the drawing. The solenoid means 208 is connected to the timing means 44 to receive an energizing signal therefrom which will develop lines of magnetic flux in the coil 206. These lines of magnetic flux will cause the plunger 196 to move in opposition to spring 210.

While the oxygen enriched effluent is flowing from the inlet port 132 to the first outlet port 138, the second outlet port 140 is closed to permit pump means 176 to evacuate air, oxygen and nitrogen products present in the barium oxide-barium dioxide bed 24 by reducing the pressure therein to about 2 psi through the second diverter valve means 178.

The second diverter valve means 178 includes a housing 212 with a bore 220 therein. The bore 220 has a first inlet port 214 connected by conduit 216 to the heat exchanger chamber 218 which in turn is connected to the second barium oxide-barium dioxide chamber 26, a first outlet port 222 connected to the atmosphere or environment by a conduit 224 extending through shroud 190, and a second outlet port 226 connected to conduit 194 going to the vacuum pump 176. A plunger 228 located in the bore 220 has a land 230 and a land 232 which segregate the first outlet port 222 from the second outlet port 226. A stem 234 attached to plunger 228 extends through bearing wall 242 into the center of coil 236 of solenoid 238. A spring or resilient means 240 located between the bearing 242 and land 232 will hold the plunger 228 against the bottom of bore 220 while the solenoid means 238 is in an unenergized state. The solenoid means 238 is connected to the timing means 44 to simultaneously receive an energizing signal with the first diverter valve means 174 and the cycling valve means 96. The duration of this energization signal will be approximately 1 minute at which time the solenoids 156, 208 and 238 will simultaneously move their respective plungers to alternately change the cycling operation of the barium oxide bed 24 and 26 from a reaction chamber to a vacuum chamber.

The diverter valves 174 and 178 are subjected to the heat of reaction created in the barium oxide-barium dioxide beds 24 and 26. To prolong their effective operative life, a conduit 244 is connected to conduit 58 carrying the nitrogen enriched cooling effluent from the first section 12. This cooling effluent can be directed by baffles attached to the shroud 190 toward the areas of greatest heat, such as the first outlet port 186 in the first diverter valve 174 and the first outlet port 222 in the second diverter valve means 178.

In the event of a malfunction in the timing means 44 such as electrical source 246, the resilient means 148 will hold the cycling valve 96 and resilient means 210 and 240, respectively, will hold the first and second diverter valves 174 and 178 in a position to permit the oxygen enriched effluent in conduit 94 to flow through one of the barium oxide beds 24 and 26 without damage thereto.

Further during such a malfunction if the heaters 162 and 163 are not receiving timed electrical energy from the timing means 44, valve 248 can be opened and the oxygen enriched effluent will be directed to bypass the second position 14 and flow through a demand regulator 18 to the oxygen mask 20.

The oxygen mask 20 is of conventional structure for the most part and includes an air inhalation valve 252 which controls the outlet flow from hose 258 to the recipient's face cavity 254 and an air exhalation valve 256 which controls air flow out of the face cavity 254 to the environment. The exhalation valve 256 normally is held closed by a balance of opposing forces acting thereagainst which forces are derived from the pressure in face cavity 254 acting against the effective areas of inhalation valve 252 and exhalation valve 256 exposed thereto and opposing pressure in hose 258 acting against an equivalent area defined by the opposite side of inhalation valve 252 and area of a diaphragm 260 attached thereto. The diaphragm 260 is exposed to a chamber 262 which is vented to hose 258 via a restricted passage 264. The exhalation valve 256 is assisted to a closed position by a preload force exerted thereagainst by a relatively light compression spring 266. During a breathing cycle in the mast 20, inhalation generates a pressure differential across inhalation valve 252 which opens to charge face cavity 254 with oxygen enriched air from hose 258 and an exhalation generates a reversed pressure differential across inhalation valve 252 and opens exhalation valve 256 to vent face cavity 254 to ambient pressure outlet port 268. As the exhalation pressure in face cavity 254 decreases, the force unbalance holding exhalation valve 256 open decreases accordingly and establishes a force balance to again close exhalation valve 256. The cycle is repeated as breathing in mask 20 continues.

Thus, the molecular sieve apparatus in section 14 or the barium oxide-barium dioxide oxygen extraction apparatus in section 16 are capable of individually producing an oxygen enriched effluent to sustain a recipient for a set period of time without degeneration of either. However, when combined as described above, pure oxygen can be manufactured quickly and conveniently without bulky storage equipment.

I claim:

1. A system for producing an oxygen effluent, said system comprising:

pressurizing means for delivering air under pressure to a supply conduit;

filter means located in a supply conduit through which pressurized air from the environment is passed for removing airborne contaminants;

valve means connected to the supply conduit for sequentially directing the pressurized air into a first flow path and into a second flow path for a predetermined time interval;

separator means having a housing with a first chamber and a second chamber therein, said first chamber and said second chamber being connected in series to said valve means, said first and second chambers each containing a quantity of molecular sieve material to which nitrogen has an affinity to produce an oxygen enriched fluid composed of substantially equal percentages of oxygen and nitrogen upon the valve means sequentially directing the pressurized air thereto;

parallel conduit means connecting the first chamber to the second chamber, said parallel conduit means being interconnected by a restricted passage, said parallel conduit means having directional flow controlling means to establish the first and second flow paths between the series positioned first and second chambers;

cycling means connected to said parallel conduit means for communicating a portion of said oxygen enriched fluid from the parallel conduit means to a distribution conduit means while the remainder of said oxygen enriched fluid passes through said restricted passage into a branch of the parallel conduit means to the first and second chambers in an alternate sequence with the pressurized air flow from the valve means, said oxygen enriched fluid combining with any nitrogen retained in the molecular sieve material in the first and second chambers to produce a first nitrogen enriched fluid which is communicated to a first outlet conduit;

oxygen extracting means having a housing with a third chamber and a fourth chamber located therein, said third and fourth chambers each containing a quantity of barium oxide elements, said cycling means alternately presenting said oxygen enriched effluent to the third and fourth chambers through said distribution conduit means where the barium oxide elements upon being heated are converted to barium dioxide, said third chamber having a first exit port and said fourth chamber having a second exit port;

heat exchanger means associated with said distribution conduit means for raising the temperature of the oxygen enriched fluid to enhance said conversion of barium oxide to barium dioxide;

diverter valve means connected to said first exit port and said exit port for alternately communicating the third chamber and the fourth chamber to an exhaust conduit, to allow a second nitrogen enriched fluid to escape to the atmosphere, and to a second outlet conduit;

pump means connected to said second outlet conduit for alternately lowering the pressure in the third and fourth chamber to allow the barium dioxide elements to revert to barium oxide elements, by releasing an oxygen effluent, said oxygen effluent being communicated to a storage chamber, said first outlet conduit being connected to said second outlet conduit for cooling the oxygen effluent; and timing means connected to said valve means, to said cycling means, to said oxygen extracting means, to said diverter valve means, and to said pump means for controlling the optimum operational time interval during which said oxygen enriched fluid and said oxygen effluent will be produced.

2. The system, as recited in claim 1, wherein said valve means includes:

a housing having a bore therein with a first port connected to a filter means which will remove any air borne contaminants which could affect the conversion of barium oxide to barium dioxide, a second port connected to the first chamber, a third port connected to said second chamber, a fourth port, and a fifth port connected to said second outlet conduit going to said storage container;

piston means located in said bore having a series of lands thereon such that in a first position communication is established between the first port and the second port, and the third port and the fifth port and in a second position communication is established between the first port and the third port, and the second port and the fourth port;

resilient means associated with said bore means for moving said piston means to one of said first and second positions; and solenoid means located in said housing and connected to said timing means for moving said piston means to the other of said first and second positions in response to a signal from the timing means.

3. The system, as recited in claim 2, wherein said cycling means includes:

a housing with a bore therein, said bore having an inlet port, a first outlet port, and a second outlet port, said inlet port being connected to receive the oxygen enriched fluid from the parallel conduit, said first outlet port being connected through the distribution conduit means to a first bed barium oxide elements in the oxygen extracting means, and said second outlet port being connected through the distribution conduit means to a second bed of barium oxide elements in the oxygen extracting means;

plunger means located in said bore for separating the first outlet port from the second outlet port, said plunger means being moved from a first location where the inlet port communicates with the first outlet port to a second location where the inlet port communicates with the second outlet port;

resilient means located in said bore for moving said plunger means to one of said first and second locations; and solenoid means associated with said housing and connected to said timing means for moving said plunger means to the other of said first and second locations to alternately allow barium oxide to be converted into barium dioxide in one of said third and fourth chambers while barium dioxide reverts into barium oxide in the other of said third and fourth chambers.

4. The system as recited in claim 1 wherein said heat exchanger means includes:
  housing means having a chamber with a first passage connected to the beds of barium oxide elements and a second passage connected to the atmosphere and to the storage container;
  a conduit centrally located in said chamber for connecting said cycling means with the beds of barium oxide elements; and
  a series of discs fixed on said centrally located conduit radially extending to the limits of the chamber, each of said discs having random perforations therein through which said second nitrogen enriched fluid travels from the first passage along the second passage before reaching one of said first and second exit ports.

5. The system, as recited in claim 4, wherein said diverter valve means includes:
  a housing having a bore therein with an inlet connected to the first and second exit ports of the oxygen extracting means, a first outlet connected to the environment through the exhaust conduit and a second outlet connected to the storage chamber through the second outlet conduit;
  plunger means located in the bore for separating the first outlet from the second outlet, said plunger being adapted to move from a first position where one of said first and second outlets is in communication with the inlet to a second position where the other of said first and second outlets is in communication with the storage reservoir;
  resilient means in said bore for moving the plunger means to one of said first and second positions; and
  solenoid means associated with said housing and connected to said timing means for moving said plunger means to the other of said first and second positions to alternately allow the second nitrogen enriched fluid to escape to the atmosphere while the oxygen effluent is retained in the storage container.

6. The system as recited in claim 5, further including:
  shroud means associated with each of said diverter valve means and connected to said first outlet conduit carrying said first nitrogen enriched fluid for cooling the solenoid means therein to attenuate the affect the heated second nitrogen enriched fluid may have thereon.

* * * * *